(12) United States Patent
Torii

(10) Patent No.: US 7,731,427 B2
(45) Date of Patent: Jun. 8, 2010

(54) WHEEL BEARING APPARATUS INCORPORATED WITH A WHEEL SPEED DETECTING APPARATUS AND METHOD OF ITS ASSEMBLY

(75) Inventor: Akira Torii, Iwata (JP)

(73) Assignee: NTN Corporation (JP)

( * ) Notice: Subject to any disclaimer, the term of this patent is extended or adjusted under 35 U.S.C. 154(b) by 468 days.

(21) Appl. No.: 11/884,245

(22) PCT Filed: Feb. 14, 2006

(86) PCT No.: PCT/JP2006/302510

§ 371 (c)(1),
(2), (4) Date: Aug. 13, 2007

(87) PCT Pub. No.: WO2006/088012

PCT Pub. Date: Aug. 24, 2006

(65) Prior Publication Data

US 2008/0159675 A1 Jul. 3, 2008

(30) Foreign Application Priority Data

Feb. 15, 2005 (JP) .............................. 2005-037110

(51) Int. Cl.
*F16C 19/00* (2006.01)
(52) U.S. Cl. ..................................... 384/544; 384/448

(58) Field of Classification Search ................. 384/544, 384/589, 448
See application file for complete search history.

(56) References Cited

U.S. PATENT DOCUMENTS

| | | | |
|---|---|---|---|
| 6,715,926 B2* | 4/2004 | Tajima et al. ................ | 384/544 |
| 6,942,393 B2* | 9/2005 | Ozawa et al. ............... | 384/544 |
| 7,341,321 B2* | 3/2008 | Takahashi et al. ........... | 384/448 |

FOREIGN PATENT DOCUMENTS

| | | | |
|---|---|---|---|
| JP | 2003-097577 A | 4/2003 | |
| JP | 2003-269476 A | 9/2003 | |
| JP | 2003-301854 A | 10/2003 | |

* cited by examiner

*Primary Examiner*—Thomas R Hannon
(74) *Attorney, Agent, or Firm*—Harness, Dickey & Pierce, P.L.C.

(57) ABSTRACT

A wheel bearing apparatus incorporating a wheel speed detecting apparatus and a method for manufacturing the wheel bearing apparatus has a wheel speed detecting apparatus (21) with a sensor holder (22). The sensor holder (22) includes a steel annular fitting ring (24) to be fit onto the end of the outer member (4). A holding portion (25) of plastic resin is integrally molded with the annular fitting ring (24). A wheel speed sensor (26) is embedded in the resin. An inboard side seal (11) of the seals (11, 12) is arranged between the sensor holder (22) and the outer joint member (14). The maximum diameter of the sensor holder (22) and the constant velocity universal joint (3) is smaller than the inner diameter of the knuckle (N).

5 Claims, 8 Drawing Sheets

WHEEL BEARING APPARATUS INCORPORATED WITH A WHEEL SPEED DETECTING APPARATUS AND METHOD OF ITS ASSEMBLY

CROSS-REFERENCE TO RELATED APPLICATIONS

This application is a National Stage of International Application No. PCT/JP2006/302510, filed Feb. 14, 2006, which claims priority to JP 2005-037110, filed Feb. 15, 2005. The disclosures of the above applications are incorporated herein by reference.

FIELD

The present disclosure relates to a wheel bearing apparatus for a vehicle wheel and a method of its assembly incorporating a wheel speed detecting apparatus to detect rotational speed of the vehicle wheel.

BACKGROUND

Wheel bearing apparatus that supports a vehicle wheel relative to a suspension apparatus incorporating a wheel speed detecting apparatus to detect rotational speed of the vehicle wheel to detect the wheel speed to control the anti-lock braking system (ABS) is known. Such a bearing apparatus generally includes a wheel speed detecting apparatus with a magnetic encoder having magnetic poles alternately arranged along its circumferential direction integrated into a sealing apparatus. The sealing apparatus is arranged between the inner and outer members to contain the rolling elements (balls or rollers). A wheel speed detecting sensor is present to detect the variation in the magnetic poles of the magnetic encoder according to the rotation of the wheel.

On the other hand, the wheel bearing apparatus to support a vehicle wheel has been orderly developed. In the first generation type, a double row rolling bearing is independently adopted provided with seals. In the second generation type, an outer member is integrally formed with a body mounting flange. In the third generation type, a wheel hub is integrally formed with a wheel mounting flange. Also, it is formed with one inner raceway surface of a double row rolling bearing on its outer circumferential surface. In the fourth generation type, a wheel hub is further combined with a constant velocity universal joint. The other inner raceway surface of the double row rolling bearing is formed on the outer circumferential surface of the outer joint member forming the constant velocity universal joint.

Recently, there is a tendency to adopt the fourth generation type to reduce weight and size in order to reduce manufacturing cost. In this case it is difficult to keep a space to mount the wheel speed detecting apparatus because of the integration of the constant velocity universal joint to the wheel hub. In such a wheel bearing apparatus, there is concern that foreign matter may become mingled with magnetic powder that would adhere to a magnetic encoder of the detecting portion of the wheel speed detecting apparatus. This is possible because the wheel speed detecting apparatus is exposed to muddy water and the foreign matters would contact the rotation speed detecting sensor and damage it or the magnetic encoder and thus detract from the detecting accuracy. A wheel bearing apparatus of the prior art which can solve such a problem is shown in FIG. 9.

The vehicle wheel bearing apparatus includes a constant velocity universal joint 51; a wheel hub 53 mounted on the outer circumference of a shaft portion 52 of the constant velocity universal joint 51; a double row rolling bearing 54 arranged both on the outer circumferences of the shaft portion 52 and the wheel hub 53; an inboard side seal 55 to seal the inboard side of the double row rolling bearing 54 arranged on the outer circumference of the constant velocity universal joint 51; and a wheel speed detecting apparatus 56 arranged on the outer circumference region at the inboard side of the double row rolling bearing 54. In the description of the present disclosure, an outer side of a bearing apparatus, when it is mounted on a vehicle, is referred to as the "outboard" side (the right side in FIG. 9), and an inner side of the bearing apparatus when it is mounted on a vehicle is referred to as the "inboard" side (the left side in FIG. 9).

The constant velocity universal joint 51 has a cup shaped outer joint member 57, a joint inner ring (not shown), torque transmitting balls, cage etc. The outer joint member 57 has a shaft portion 52 with splines 58 mating with splines of wheel hub 54. An outer circumferential surface of the outer joint member 57 is formed with an inner raceway surface 57a. In addition an annular recess 60 is formed between the outer joint member 57 and the shaft portion 52 opened toward the double row rolling bearing 54.

The wheel hub 53 has a hollow cylindrical configuration and is integrally formed with a radially extending wheel mounting flange 61. The hollow bore 62 of the wheel hub 53 is formed with splines 63. Another inner raceway surface 53a of the double row rolling bearing 54 is formed on the outer circumference of the wheel hub 53 at the inboard side of the wheel mounting flange 61.

The double row rolling bearing 54 is formed by a double row angular ball bearing. An outer member 59 is integrally formed with a body mounting flange 59b. Its inner circumference is formed with outer raceway surfaces 59a, 59a. An inner member 64 has double row inner raceway surfaces 53a, 57a on its outer circumference. The inner raceway surfaces 53a, 57a correspond to the double row outer raceway surfaces 59a, 59a. Double row balls 66 are contained between the double row inner and outer raceway surfaces, via cages 65. In the present specification, the inner member 64 includes the outer joint member 57 and the wheel hub 53. A seal 67 is arranged at the outboard side of the outer member 59.

The constant velocity universal joint 51, the wheel hub 53 and the double row rolling bearing 54 are assembled together by engaging splines of the wheel hub 53 and the constant velocity universal joint 51. The seal 67 and balls 66 are previously arranged on the outboard side between the outer member 59 and the wheel hub 53. Then the outboard side end of the shaft portion 52 is caulked on the outboard side end face of the wheel hub by bending the outboard side end of the shaft portion 52 radially outward.

The wheel speed detecting apparatus 56 includes a pulser ring 69 and a wheel speed sensor 70. The pulser ring 69 is formed as a disk. A permanent magnet is arranged on the disk. The magnet includes rubber magnet mingled with ferritic powder with N and S poles being alternately arranged along its circumferential direction. A supporting ring 71, having a L-shaped cross-section is press fit onto the shaft portion 52 of the constant velocity universal joint 51. The pulser ring 69 is secured on the supporting ring 71. A metal core 72, forming the inboard side seal 55 for the double row rolling bearing 54, axially extends to cover the annular recess 60.

A relatively long axial labyrinth gap S is formed between the metal core 72 and the outer joint member 57. The metal core 72 is formed with an elongated oval opening through which the wheel speed sensor 70 is inserted. The wheel speed sensor 70 is arranged opposite to the pulser ring 69 and is formed as an active sensor including a magnetic detecting element such as a Hall effect element or magnetic resistance element to vary output in accordance with the magnetic flow direction. IC etc is incorporated into a circuit to rectify the output wave form of the magnetic detecting element.

A knuckle 73, forming part of a suspension apparatus, is formed with a radially through bore 73a. The wheel speed sensor 70 is screwed into the bore 73a. Thus, the wheel rotation speed can be detected by the wheel speed sensor 70 detecting the variation of magnetic flux of the pulser ring 69 when the pulser ring is rotated in accordance with the rotation of the shaft portion 52 of the constant velocity universal joint 51.

As described above, due to the structure of the axially extending metal core 72 of the seal 55 in the double row rolling bearing 54, the wheel speed sensor 70 being passed through and screwed into the knuckle 73 and the annular recess 60 covered by the metal core 72, ingress of foreign matter, such as muddy water, into the annular recess 60 can be prevented.

Reference: Patent Document 1 (Japanese Laid-open Patent Publication No. 301854/2003).

However, since the detecting portion is merely covered by the labyrinth gap S between the metal core 72 and the outer joint member 57, it is insufficient to perfectly prevent the ingress of foreign matter, such as magnetic powder, although direct exposure to the detecting portion to muddy water can be prevented.

In addition, due to the structure of the wheel speed sensor 70 screwed into the knuckle 73 and passed through the opening of the metal core 72, it is difficult to firmly align the securing bore 73a of the knuckle 73 and the opening of the metal core 72. The number of machining processes of the bore or opening is increased and machining accuracy is required. This additionally increases the manufacturing cost of the wheel bearing apparatus.

SUMMARY

It is, therefore, an object of the present disclosure to provide a wheel bearing apparatus incorporating a wheel speed detecting apparatus and a method of its assembly which prevents the ingress of foreign matter into the detecting portion and additionally reduces the weight and size of the apparatus.

According to the present disclosure, a wheel bearing apparatus incorporating a wheel speed detecting apparatus is formed by a unit of a wheel hub, a double row rolling bearing and a constant velocity universal joint. The double row rolling bearing comprises an outer member integrally formed, on its outer circumference, with a body mounting flange. The flange is to be mounted on a knuckle forming part of a suspension apparatus. The outer member is formed, on its inner circumference, with double row outer raceway surfaces. An inner member includes a wheel hub with an integrally formed wheel mounting flange at one end. A cylindrical portion axially extends from the wheel mounting flange. An inner raceway surface is formed on the outer circumference of the cylindrical portion. The inner raceway surface corresponds to one of the double row outer raceway surfaces. An outer joint member of the constant velocity universal joint is coupled with the wheel hub. The outer joint member is formed with another inner raceway surface that corresponds to the other of the double row outer raceway surfaces. A shaft portion axially extends from the other inner raceway surface. Double row rolling elements are rollably arranged between the outer and inner raceway surfaces. Seals are mounted in annular spaces formed at opposite ends of the outer member and the outer joint member. The wheel speed detecting apparatus comprises a magnetic encoder fit onto the outer joint member. A wheel speed sensor is arranged opposite to the magnetic encoder, via a predetermined air gap, and mounted on the end of the outer member. The wheel hub and the outer joint member are plastically and integrally connected by caulking the shaft portion of the outer joint member onto the wheel hub The wheel speed detecting apparatus further comprises a sensor holder. The sensor holder includes a steel annular fitting ring to be fit onto the end of the outer member. A holding portion of plastic resin is integrally molded with the annular fitting ring. The wheel speed sensor is embedded in the resin. The inboard side seal of the seals is arranged between the sensor holder and the outer joint member. The maximum diameter of the sensor holder and the constant velocity universal joint is smaller than the inner diameter of the knuckle.

The wheel speed detecting apparatus further comprises a sensor holder. The sensor holder includes a steel annular fitting ring to be fit onto the end of the outer member. A holding portion of plastic resin is integrally molded with the annular fitting ring. The wheel speed sensor is embedded in the resin. The inboard side seal of the seals is arranged between the sensor holder and the outer joint member. The maximum diameter of the sensor holder and the constant velocity universal joint is smaller than the inner diameter of the knuckle. Accordingly, it is possible to provide a wheel bearing apparatus incorporating a wheel speed detecting apparatus that can prevent the ingress of foreign matter into the detecting portion and additionally reduce the weight and size of the apparatus.

The annular fitting ring comprises a cylindrical fitting portion to be press fit onto the outer member. A flange portion extends radially inward from the fitting portion and is to be intimately contacted with the end face of the outer member. A cylindrical portion axially extends from the flange portion. The holding portion is formed so that it projects radially inward from the cylindrical portion. The seal is arranged at the inboard side of the holding portion. Thus, this makes it possible to surely prevent ingress of foreign matter, such as magnetic powders from the circumstances, into a space between the magnetic encoder and the wheel speed sensor.

The magnetic encoder may be arranged at the outboard side of the holding portion. The magnetic encoder may be formed integrally with the seal.

A method of assembling a wheel bearing apparatus incorporating a wheel speed detecting apparatus comprises the steps of press fitting the seal onto the outer circumference of the outer joint member; fitting the sensor holder onto the end of the outer member; fitting the outer joint member into the wheel hub; caulking the shaft portion of the outer joint member onto the wheel hub by plastically deforming the shaft portion; fitting the sensor holder, previously guided into a joint press fitting tool, into the position of the seal after said seal press fitting step, and mounting the sensor holder onto the outer member via the joint press fitting tool simultaneously with the fitting of the outer joint member into the wheel hub.

This enables assembly of an axle module to the knuckle and thus improves ease of disassembly and assembly of the axle module during service of a vehicle. In addition, the structure where the shaft portion of the outer joint member is fit into the wheel hub and the sensor holder guided by the press fitting tool mounted onto the inboard side end of the outer member enables a reduction in the number of assembly steps and thus simplifies the workability in assembly as well as reduces manufacturing cost.

The wheel bearing apparatus of the present disclosure incorporates a wheel speed detecting apparatus formed by a unit of a wheel hub, a double row rolling bearing and a constant velocity universal joint. The double row rolling bearing comprises an outer member integrally formed, on its outer circumference, with a body mounting flange. The flange is to be mounted on a knuckle, forming part of a suspension apparatus. The outer member is formed, on its inner circumference, with double row outer raceway surfaces. An inner member includes a wheel hub with an integrally formed wheel mounting flange at one end. A cylindrical portion axially extends from the wheel mounting flange. An inner raceway surface is formed, on the outer circumference of the cylindrical. The inner raceway surface corresponds to one of the double row outer raceway surfaces. An outer joint member of the constant velocity universal joint is coupled with the wheel hub. The outer joint member is formed with the other inner raceway surface that corresponds to the other of the double row outer raceway surfaces. A shaft portion axially extends from the other inner raceway surface. Double row rolling elements are rollably arranged between the outer and inner raceway surfaces. Seals are mounted in annular spaces formed at opposite ends of the outer member and the outer joint member. The wheel speed detecting apparatus comprises a magnetic encoder fit onto the outer joint member. A wheel speed sensor is arranged opposite to the magnetic encoder, via a predetermined air gap, and mounted on the end of the outer member, the wheel hub and the outer joint member are integrally connected by plastically caulking the shaft portion of the outer joint member onto the wheel hub The wheel speed detecting apparatus further comprises a sensor holder. The sensor holder includes a steel annular fitting ring to be fit onto the end of the outer member. A holding portion of plastic resin is integrally molded with the annular fitting ring. The wheel speed sensor is embedded in the resin. The inboard side seal of the seals is arranged between the sensor holder and the outer joint member. The maximum diameter of the sensor holder and the constant velocity universal joint is smaller than the inner diameter of the knuckle. Accordingly, it is possible to provide a wheel bearing apparatus incorporating a wheel speed detecting apparatus that can prevent the ingress of foreign matter into the detecting portion and additionally reduce the weight and size of the apparatus.

The method for assembling a wheel bearing apparatus of the present disclosure incorporated with a wheel speed detecting apparatus comprises the steps of press fitting the seal onto the outer circumference of the outer joint member; fitting the sensor holder onto the end of the outer member; fitting the outer joint member into the wheel hub; caulking the shaft portion of the outer joint member onto the wheel hub by plastically deforming the shaft portion; fitting the sensor holder, previously guided into a joint press fitting tool, into the position of the seal after the seal press fitting step; and mounting the sensor holder onto the outer member, via the joint press fitting tool; simultaneously with the fitting of the outer joint member into the wheel hub. Accordingly, it is possible to reduce the number of assembly steps and thus to simplify the workability during assembly as well as to reduce manufacturing cost.

A wheel bearing apparatus incorporated with a wheel speed detecting apparatus is formed by a unit of a wheel hub, a double row rolling bearing and a constant velocity universal joint. The double row rolling bearing comprises an outer member integrally formed, on its outer circumference, with a body mounting flange. The flange is to be mounted on a knuckle forming part of a suspension apparatus. The outer member is formed, on its inner circumference, with double row outer raceway surfaces. An inner member includes the wheel hub with an integrally formed wheel mounting flange at one end. A cylindrical portion axially extends from the wheel mounting flange. An inner raceway surface is formed on the outer circumference of the cylindrical portion. The inner raceway surface corresponds to one of the double row outer raceway surfaces. An outer joint member of the constant velocity universal joint is coupled with the wheel hub. The outer joint member is formed with the other inner raceway surface that corresponds to the other of the double row outer raceway surfaces. A shaft portion axially extends from the other inner raceway surface. Double row rolling elements are rollably arranged between the outer and inner raceway surfaces. Seals are mounted in annular spaces formed at opposite ends of the outer member and the outer joint member. The wheel speed detecting apparatus comprises a magnetic encoder fit onto the outer joint member. A wheel speed sensor is arranged opposite to the magnetic encoder, via a predetermined air gap, and is mounted on the end of the outer member. The wheel hub and the outer joint member are integrally connected by caulking the shaft portion of the outer joint member onto the wheel hub. The wheel speed detecting apparatus further comprises a sensor holder. The sensor holder includes a steel annular fitting ring to be fit onto the end of the outer member. A holding portion of plastic resin is integrally molded with the annular fitting ring. The wheel speed sensor is embedded in the resin. The inboard side seal of the seals is arranged between the sensor holder and the outer joint member. The maximum diameter of the sensor holder and the constant velocity universal joint is smaller than the inner diameter of the knuckle.

DRAWINGS

Additional advantages and features of the present disclosure will become apparent from the subsequent description and the appended claims, taken in conjunction with the accompanying drawings, wherein:

Figure 1:
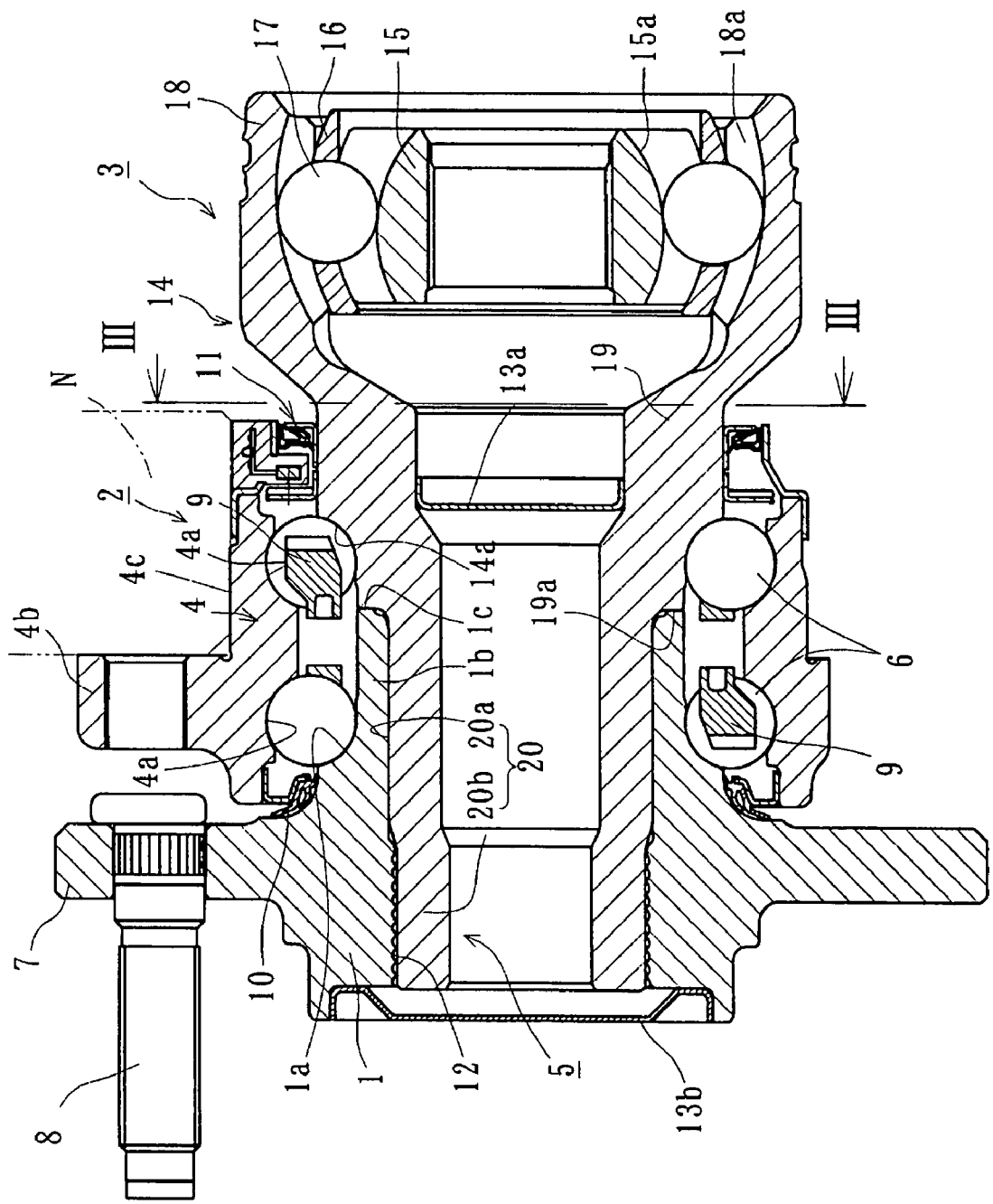
FIG. 1 is a longitudinal-section view of a first embodiment of a wheel bearing apparatus incorporating a wheel speed detecting apparatus.

FIGS. 4(a)-4(c) are longitudinal section explanatory views showing assembling steps of the wheel speed detecting apparatus of FIG. 1.

Figure 5:
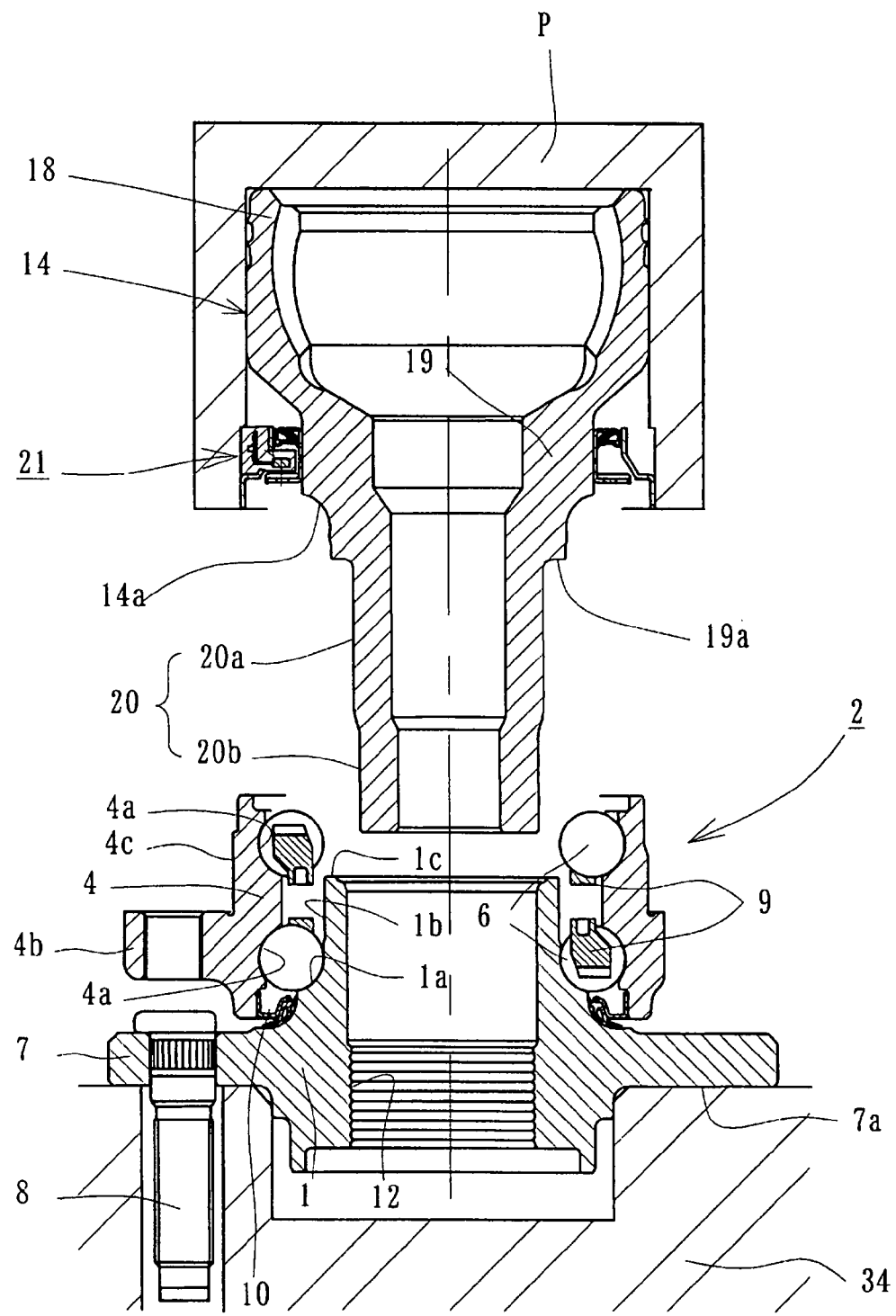

FIG. 5 is a longitudinal section explanatory view showing an assembling method of the wheel bearing apparatus incorporating a wheel speed detecting apparatus of FIG. 1.

Figure 6:
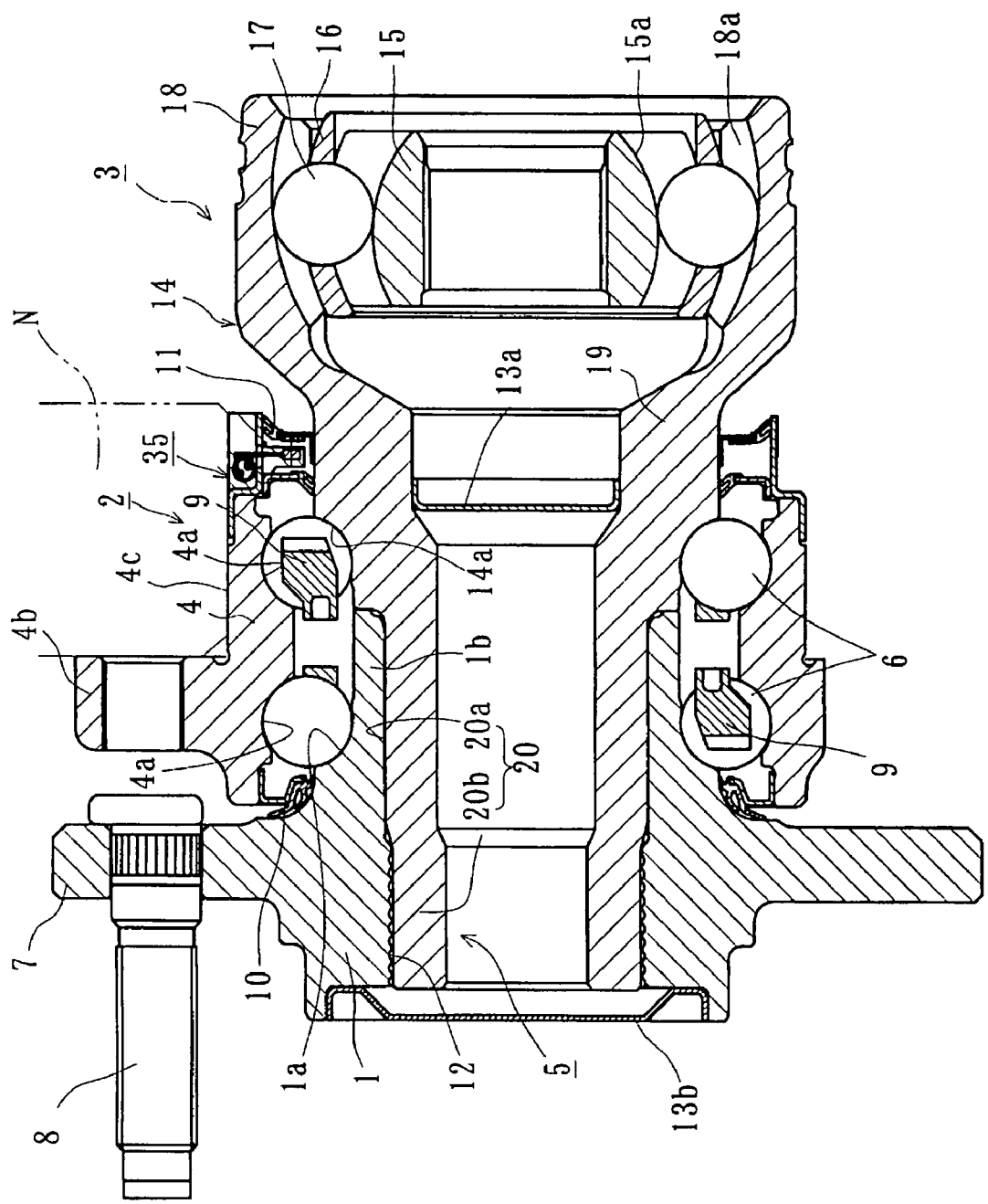

FIG. 6 is a longitudinal-section view of a second embodiment of a wheel bearing apparatus incorporating a wheel speed detecting apparatus.

Figure 7:
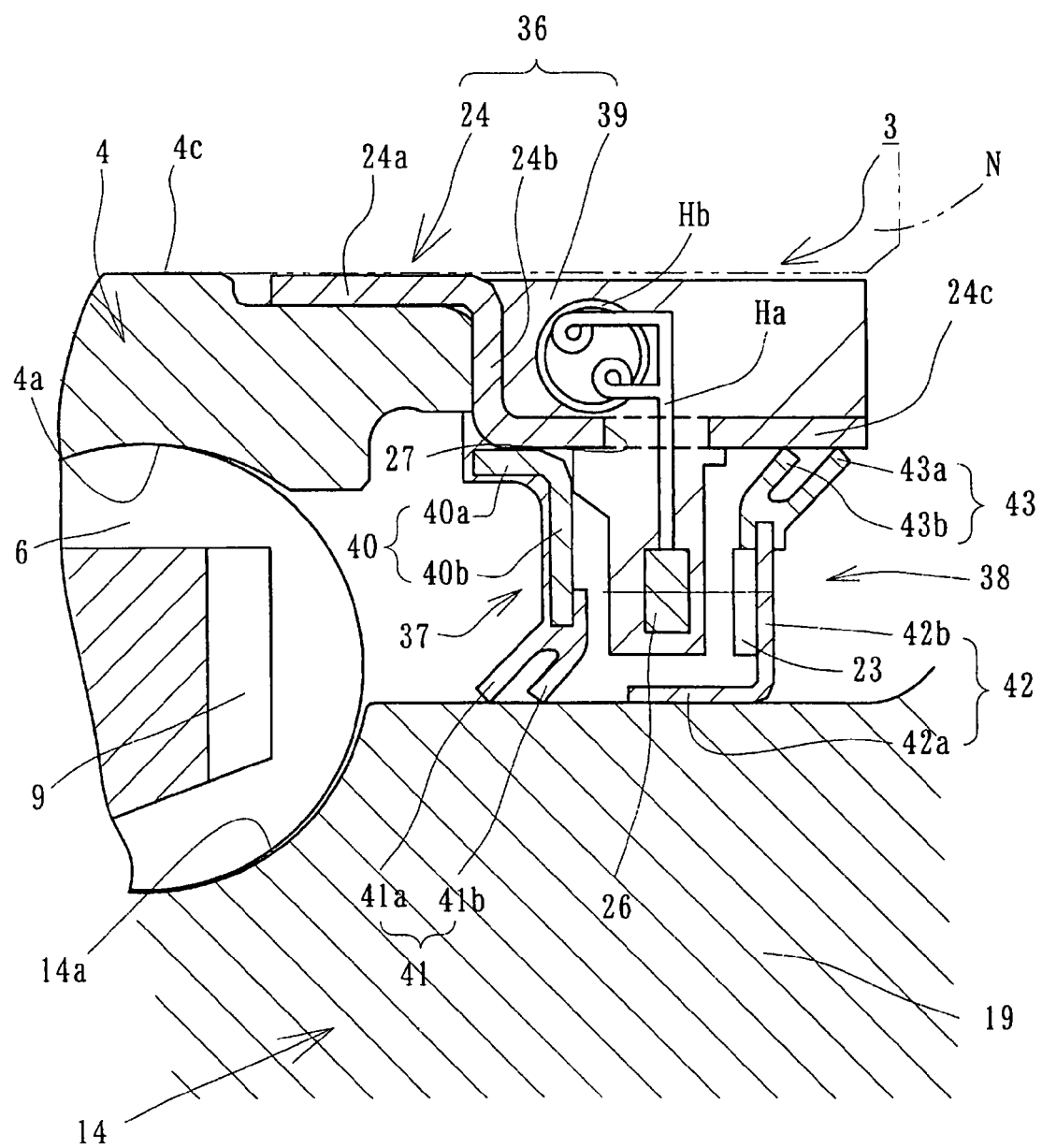

FIG. 7 is a partially enlarged longitudinal-section view of FIG. 6.

Figure 8:
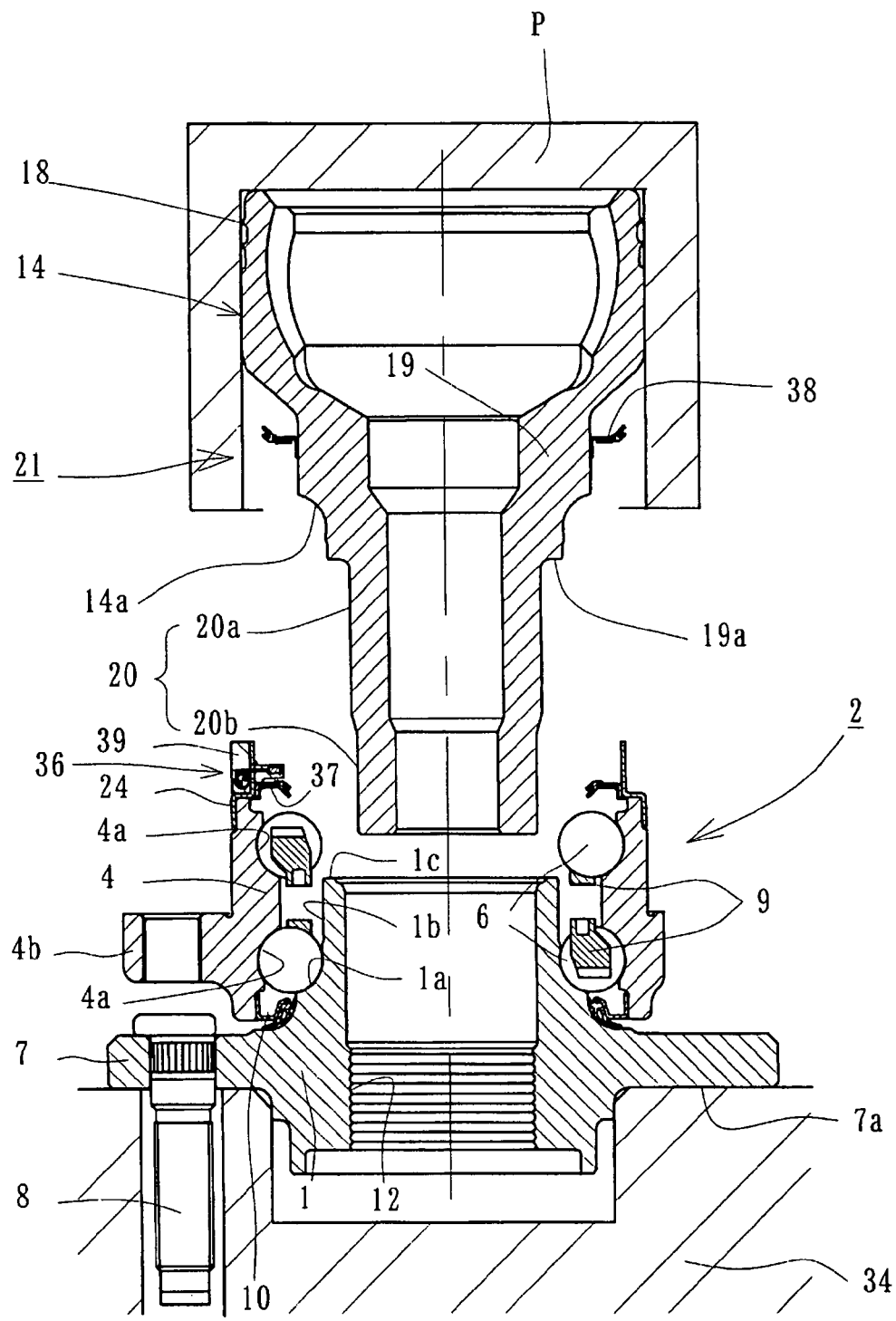

FIG. 8 is a longitudinal section explanatory view showing an assembling method of the wheel bearing apparatus incorporating with a wheel speed detecting apparatus of FIG. 6.

Figure 9:
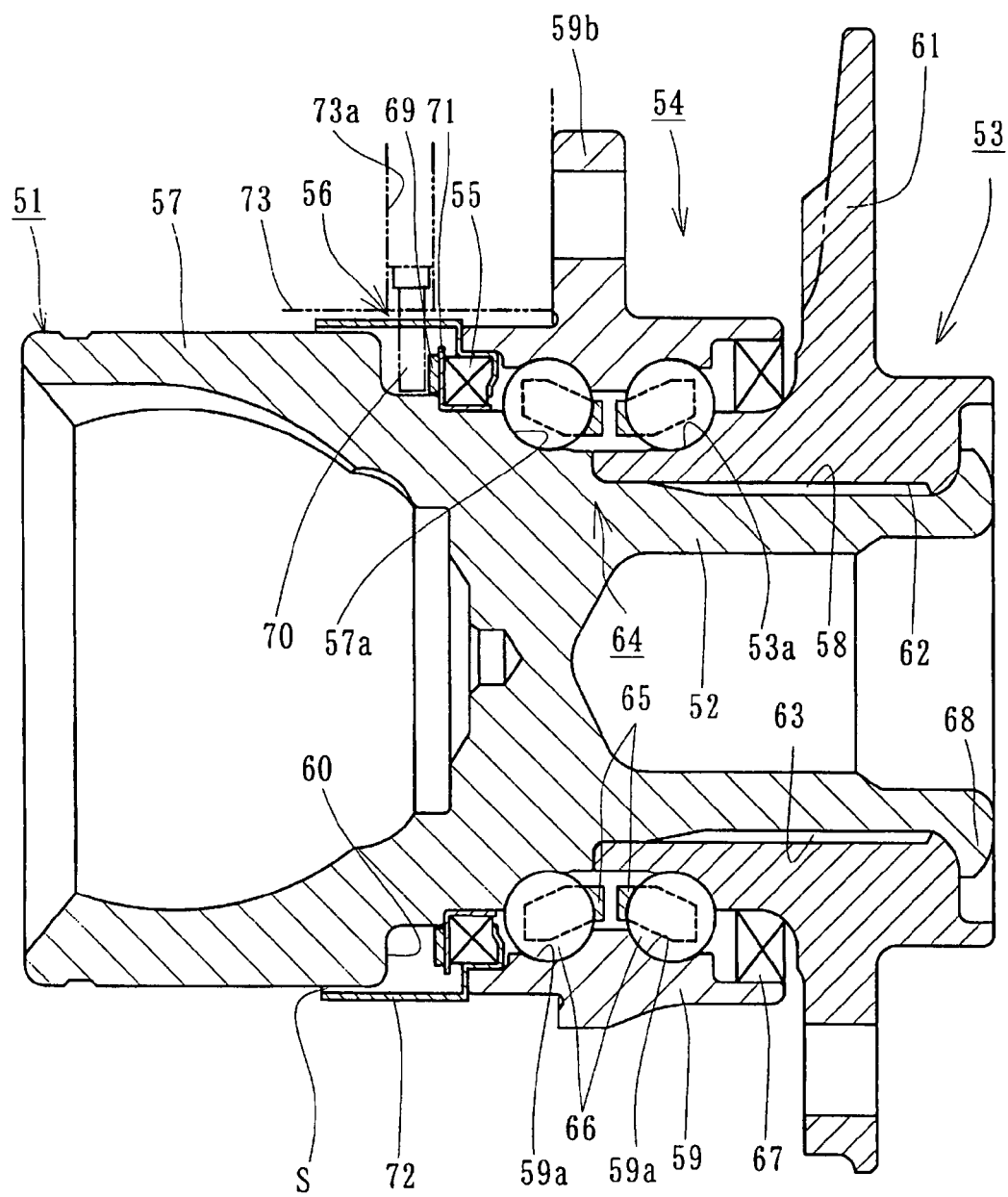

FIG. 9 is a longitudinal-section view of a wheel bearing apparatus incorporating a wheel speed detecting apparatus of the prior art.

DETAILED DESCRIPTION

Preferred embodiments of the present disclosure will be described with reference to accompanied drawings.

Figure 2:
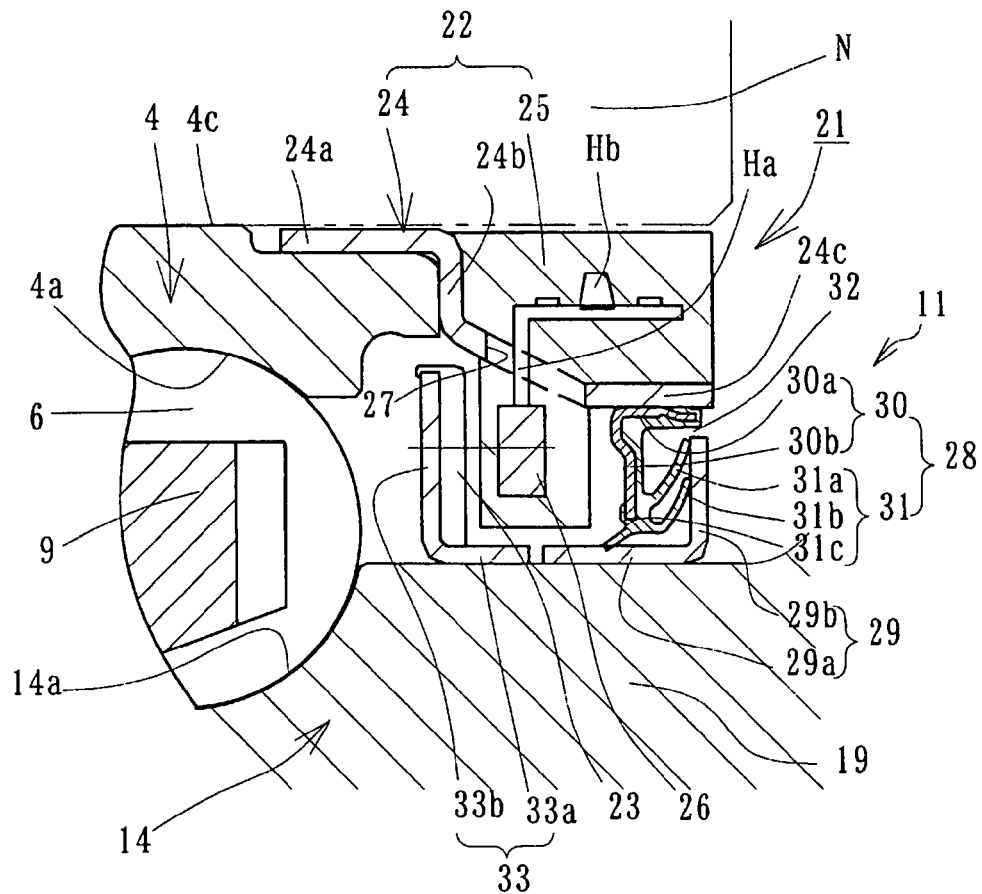
FIG. 2 is a partially enlarged longitudinal-section view of FIG. 1.
Figure 3:
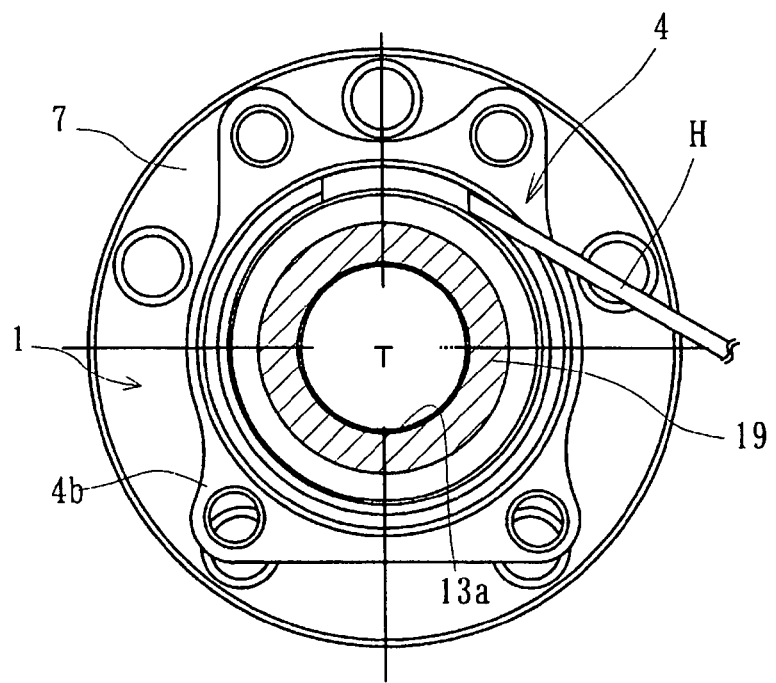
FIG. 3 is a cross-section view taken along a line III-III in FIG. 1.

FIG. 1 is a longitudinal-section view of a first embodiment of a wheel bearing apparatus incorporating a wheel speed detecting apparatus. FIG. 2 is a partially enlarged longitudinal-section view of FIG. 1. FIG. 3 is a cross-section view taken along line III-III in FIG. 1. In the description of the present invention, an outer side of a bearing apparatus when it is mounted on a vehicle is referred to as the "outboard" side (the left side in a drawing). An inner side of a bearing apparatus when it is mounted on a vehicle is referred to as the "inboard" side (the right side in a drawing).

The wheel bearing apparatus incorporating a wheel speed detecting apparatus is for a driving wheel. It is formed as a unit of a wheel hub 1, a double row rolling bearing 2 and a constant velocity universal joint 3. Thus, it has a structure of a so-called fourth generation. The double row rolling bearing 2 has an outer member 4, an inner member 5 and double row rolling elements (balls) 6, 6. The inner member 5 includes the wheel hub and an outer joint member 14 fit into the wheel hub 1.

The outer member 4 is made of medium carbon steel such as S53C including carbon of 0.40~0.80% by weight. A body mounting flange 4b is integrally formed on its outer circumference. The body mounting flange 4b is adapted to be mounted on a knuckle N of a vehicle. The outer member 4 is formed, on its inner circumference, with double row outer raceway surfaces 4a, 4a. The double row outer raceway surfaces 4a, 4a are hardened by high frequency induction hardening to have a hardness of about 58~64 HRC.

The wheel hub 1 is made of medium carbon steel such as S53C including carbon of 0.40~0.80% by weight. The wheel hub 1, at its outboard side end, has a wheel mounting flange 7 for mounting a vehicle wheel (not shown). A plurality of hub bolts 8 are equidistantly arranged along the periphery of the wheel mounting flange 7. The wheel hub 1 has one inner raceway surface 1a (outboard side) on its outer circumference. The inner raceway surface (outboard side inner raceway surface) 1a is arranged opposite to one of the double row outer raceway surfaces 4a, 4a. A cylindrical portion 1b extends from the wheel mounting flange 7. The wheel hub 1 is formed with a hardened layer having a surface hardness of 58~64 HRC. The surface is formed by high frequency induction hardening. The surface extends from a seal land portion, on which an outboard side seal 10 sliding contacts, to the inner raceway surface 1a and the cylindrical portion 1b. This not only improves the anti-friction characteristics of the seal land portion at the base of the wheel mounting flange 7 but improves the durability of the wheel hub 1. The hardening provides a sufficient mechanical strength against the rotary bending load applied to the wheel mounting flange 7.

The constant velocity universal joint 3 includes the outer joint member 14, a joint inner ring 15, cage 16 and torque transmitting balls 17. The outer joint member 14 is made of medium carbon steel such as S53C including carbon of 0.40~0.80% by weight. The outer member 14 has a cup shaped mouth portion 18, a shoulder portion 19, forming the bottom of the mouth portion 18, and a cylindrical shaft portion 20. The shaft portion 20 axially extends from the shoulder portion 19 and is integrally formed with each other. The shaft portion 20 is formed with a cylindrical spigot portion 20a and a fitting portion 20b. The spigot portion 20a is fit into the cylindrical portion 1b of the wheel hub 1, via a predetermined radial gap. The fitting portion 20b is at the end of the spigot portion 20a.

An inner surface of the mouth portion 18 is formed with axially extending curved track grooves 18a. An outer surface of the joint inner ring 15 is formed with track grooves 15a that corresponds to the track grooves 18a. An outer circumferential surface of the shoulder portion 19 is formed with the other inner raceway surface (inboard side inner raceway surface) 14a that corresponds to one of the double row raceway surfaces 4a, 4a. A hardened layer, having a surface hardness of about 58~64 HRC, is formed by high frequency induction heating. The hardened layer extends from a seal land portion, which sliding contacts the inboard side seal 11, to the inner raceway surface 14a and the shaft portion 20 and track grooves 18a, 15a. The fitting portion 20b itself remains as raw material without being hardened after being forged.

Double row rolling elements (balls) 6, 6 are arranged between the double row outer raceway surfaces 4a, 4a of the outer member 4 and corresponding double row inner raceway surfaces 1a, 14a. The balls 6 are rollably freely held by cages 9, 9. Seals 10, 11 are arranged at both ends of the outer member 4 in order to prevent the leakage of grease contained within the bearing. Also, the seals 10, 11 prevent the ingress of rain water or dust into the inside of the bearing. An end cap 13a is mounted within the shaft portion 20. The end cap 13a prevents leakage of grease contained within the mouth portion 18. Another end cap 13b is mounted on an opening of the wheel hub 1. The end cap 13b prevents ingress of rain water or muddy water into the plastically deformed connection between the wheel hub 1 and the outer joint member 14 to prevent generation of erosion. Although it is shown as a double row angular ball bearing using balls as the rolling elements 6, 6, the present disclosure is not limited to such an embodiment. Accordingly, a double row tapered roller bearing using tapered rollers as rolling elements may be used.

The inner circumferential surface of the wheel hub 1 is formed with an irregular portion 12. The irregular portion 12 is formed with a hardened layer having a surface hardness of about 54~64 HRC. The heat treatment using high frequency induction heating which can perform local heating and easily set the depth of hardened layer. The irregular portion 12 is formed with a crisscross knurl pattern formed by combining a plurality of independent annular grooves, formed by a lathe, and a plurality of axial grooves, formed by broaching, as orthogonally crossed grooves or mutually inclined helical grooves. Each projection forming the irregular portion 12 may be pointed like a pyramid to increase the biting ability of the irregular portion 12.

The shaft portion 20 of the outer joint member 14 is fit into the wheel hub 1 until the shoulder portion 19 of the outer joint member 14 abuts the end face 1c of the cylindrical portion 1b of the wheel hub 1. As described more in detail below, the wheel hub 1 and the outer joint member 14 are integrally connected to each other by expanding the fitting portion 20b of the shaft portion 20 radially outward to plastically deform and force the material of the fitting portion 20b to bite into the hardened irregular portion 12. Thus, the wheel hub and the outer joint member can be integrally connected by plastically deforming a fitting portion formed in the shaft portion of the outer joint member and by forcing the fitting portion to bite into a hardened irregular portion formed on an inner circumferential surface of the wheel hub without the need to control the pre-load by conventionally fastening a nut. This makes it possible to reduce the size and weight of the wheel bearing apparatus and to improve the strength and durability of the wheel hub as well as to maintain its pre-load for a long term.

The wheel speed detecting apparatus 21 is arranged at an inboard side end of the outer member 4. As shown in the enlarged view of FIG. 2, the wheel speed detecting apparatus 21 includes a sensor holder 22, a seal 11 and a magnetic encoder 23. The sensor holder 22 is fit onto the inboard side end of the outer member 4. The inboard side seal 11 is interposed between the sensor holder 22 and the outer joint member 14. The magnetic encoder 23 is arranged opposite to the sensor holder 22.

The sensor holder 22 includes an annular fitting ring 24 and a holding portion 25 united to the fitting ring 24. The fitting ring 24 has a generally annular configuration. The fitting ring 24 includes a cylindrical fitting portion 24a, a flange portion 24b, and a cylindrical portion 24c. The flange portion 24d extends radially inward from the fitting portion 24a. The cylindrical portion 24c axially extends from the flange portion 24b. It is designed that the maximum outer diameter of the sensor holder 22 is smaller than a pilot portion 4c (inner diameter of the knuckle N) of the outer member 4 fit into the knuckle N. That is, the end portion of the outer member 4 is formed to have a small diameter so that the fitting portion 24a of the fitting ring 24 is fit onto that end portion.

The fitting ring 24 is made by pressing a stainless steel sheet with anti-corrosion properties. The fitting ring 24 is preferably made of non-magnetic material such as austenitic stainless steel sheet (JIS SUS 304 etc). This enables the ring to keep its durability for a long term and high detecting accuracy.

The cylindrical portion 24c is formed with an aperture 27. A portion of the holding portion 25 is passed through the aperture 27 and integrally molded with the cylindrical portion 24c. Thus, the sensor holder 22 is press fit and secured onto the end portion of the outer member 4 with the seal 11 interposed between the cylindrical portion 24c of the fitting ring 24 and the outer joint member 14. The flange portion 24b of the fitting ring 24 is intimately contacted with the end face of the outer member 4. Although it is illustrated that the holding portion 25 is integrally molded with the fitting ring 24, the present disclosure is not limited to this embodiment. The holding portion 25 may be mounted on the fitting ring 24 in such a manner that a portion of the holding portion projects radially inward from the aperture 27. In addition the holding portion 25 may be formed in a circular ring configuration.

The holding portion 25 may be formed of PA (polyamide) 66 and have a generally L-shaped cross-section. The wheel speed sensor 26 is embedded in the holding portion 25 to oppose the magnetic encoder 23, via a predetermined axial air gap. The wheel speed sensor 26 includes a magnetic detecting element, such as a Hall effect element, magnetic resistance element (MR element) etc. to change its characteristics in accordance with the flow direction of magnetic flux. An IC is incorporated with a wave forming circuit to rectify the output wave form of the magnetic detecting element.

A terminal "Ha" for taking out the output signal from the wheel speed sensor 26 stands upward and radially outward from the sensor 26. The terminal Ha is connected to a harness H led out circumferentially along the end of the outer member 4 via a lead out portion "Hb" (see FIG. 3). The wheel speed sensor 26, terminal "Ha" and lead out portion "Hb", to be connected to the harness H, are all integrally molded within the plastic resin. Such a structure prevents the holding portion from being damaged or falling out by impingement of small stones during running of the vehicle or generation of corrosion in the elements forming the wheel speed detecting apparatus. Thus, this improves the durability and reliability. In addition it is possible to prevent the holding portion 25 or harness H from projecting from the outer member 4 and interfering with the knuckle N. Also, it is possible to arrange the lead out portion "Hb" in a space radially outward of the seal 11 to reduce the size of the holding portion 25.

The inboard side seal 11 has a first seal 28 and a second seal 29. Each has a substantially L-shaped cross-section. The first seal 28 is fit into the cylindrical portion 24c of the fitting ring 24 of the sensor holder 22. The second seal 29 is fit onto the outer circumference of the shoulder portion 19 of the outer joint member 14. The seals 28, 29 are arranged opposite to each other. The first seal 28 has a metal core 30 including a cylindrical portion 30a, a standing portion 30b and a sealing member 31. The cylindrical portion 30a is fit into the sensor holder 22. The standing portion 30b extends radially inward from one end of the cylindrical portion 30a. The sealing member 31 is adhered to the metal core 30. The sealing member 31 is made of an elastic member such as rubber and has a pair of side lips 31a, 31b and a grease lip 31c. The lips are integrally formed and adhered to the metal core 30, via vulcanized adhesion.

On the other hand the second seal (i.e. slinger) 29 is made by press forming austenitic stainless steel (JIS SUS 304 etc) or preserved cold rolled sheet (JIS SPCC etc). The second seal 29 has a cylindrical portion 29a fit onto the outer joint member 14 and a standing portion 29b that extends radially outward from the cylindrical portion 29a.

One pair of side lips 31a, 31b are in sliding contact with the standing portion 29b. The grease lip 31c is in sliding contact with the cylindrical portion 29a of the second seal 29. In addition the tip end of the standing portion 29b of the second seal 29 opposes the cylindrical portion 30a of the first seal 28 via a slight radial gap. The gap forms a labyrinth seal 32. This further improves the sealability of the inboard side seal 11.

A base 33 is arranged on the opposite side of the holding portion 25 of the sensor holder 22 and spaced from the seal 11. The base 33 is made by press forming a ferromagnetic steel sheet e.g. ferritic stainless steel sheet (JIS SUS 430 etc) or preserved cold rolled sheet (JIS SPCC etc) to have a generally L-shaped cross-section. A cylindrical portion 33a is fit onto the shoulder portion 19 of the outer joint member 14. A standing portion 33b extends radially outward from the cylindrical portion 33a. The magnetic encoder 23 is made of elastomer such as rubber. Magnetic powder, such as ferrite, is mingled into the rubber. The encoder 23 is adhered to the inboard side surface of the standing portion 33b, via vulcanized adhesion. The magnetic encoder 23 has magnetic poles alternately arranged along its circumferential direction and forms a rotary encoder to detect the wheel rotational speed.

The magnetic encoder 23 is arranged at the outboard side of the holding portion 25, in which the wheel speed sensor 26 is embedded. The seal 11 is arranged at the inboard side of the holding portion 25. Thus it is possible to prevent leakage of grease contained within the bearing as well as the ingress of foreign matter, such as magnetic powder, from the external circumstances into the magnetic encoder 23 and the detecting portion of the wheel speed sensor 26 even though the vehicle travels under severe circumstances. Accordingly, it is possible to improve the reliability of the detection of the wheel speed. In addition it is possible to reduce the size of the wheel speed detecting apparatus 21 and to simplify the various elements relating to the wheel speed sensor 26. Thus, this further improves the efficiency in assembly of the wheel speed detecting apparatus.

Although it is illustrated that the wheel speed detecting apparatus is of an active type which is formed of the magnetic encoder 23 and the wheel speed sensor 26 including magnetic detecting element such as Hall effect element, the wheel speed detecting apparatus of the present disclosure is not limited to the illustrated active type apparatus and a passive type wheel speed detecting apparatus including a magnetic encoder, a magnet, annular coil etc. may be used.

Figure 4:
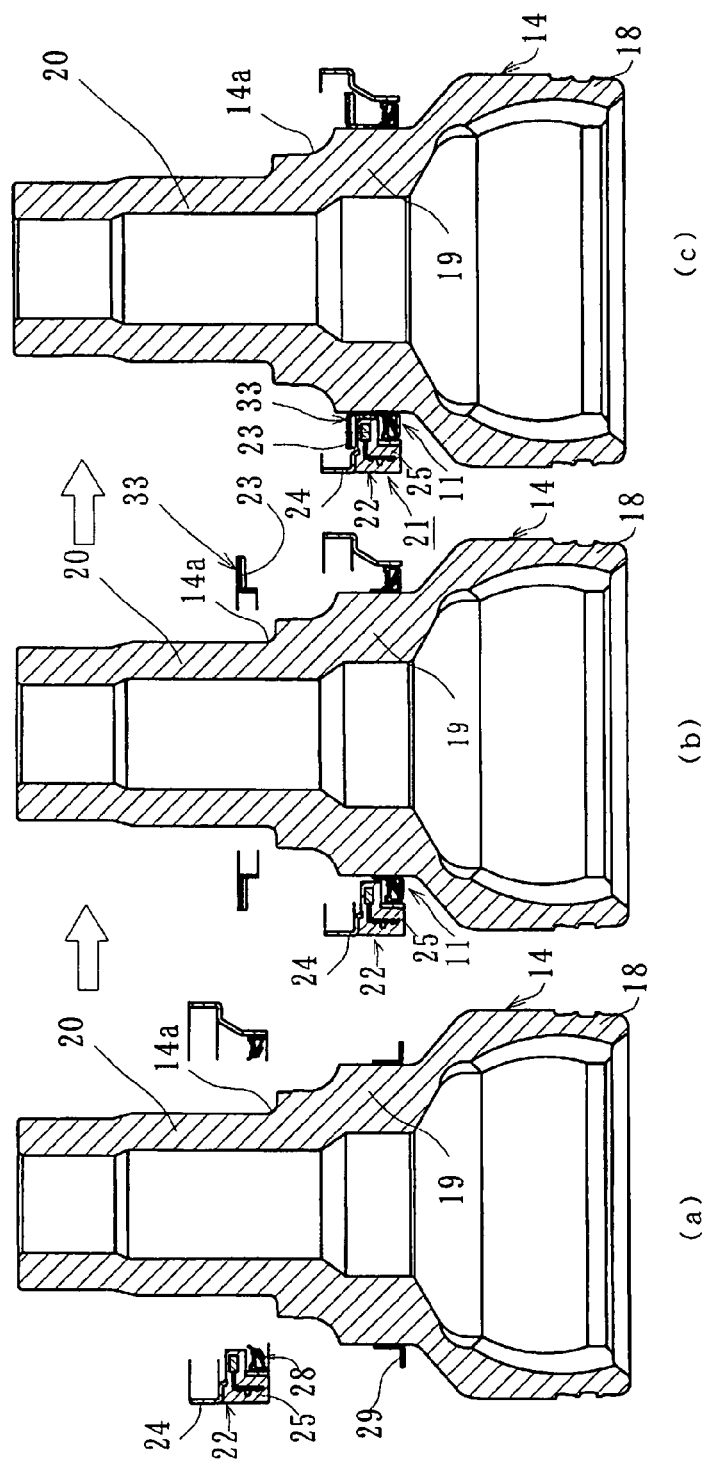

A method for assembling the wheel speed detecting apparatus and the wheel bearing apparatus will be described with reference to FIGS. 4 and 5. As shown in FIG. 4(a) the second seal 29 is press fit onto the outer circumference of the shoulder portion 19 of the outer joint member 14. In FIG. 4(b) the sensor holder 22, which the first seal 28 is previously mounted, is fit onto a position of the second seal 29. In FIG. 4(c) the base 33, which the magnetic encoder is adhered, is press fit onto the outer circumference of the shoulder portion 19.

As shown in FIG. 5, the shaft 20 of the outer joint member 14 is fit into the wheel hub 1 until the stepped portion 19a of the shoulder portion 19 of the outer joint member 14 abuts the end face 1c of the cylindrical portion 1b of the wheel hub 1. This occurs under a condition where the wheel hub 1 and the double row rolling bearing 2 are vertically nested toward each other with the outboard side surface 7a of the wheel mounting flange 7 of the wheel hub 1 abutted by a pedestal 34. Simultaneously, with this operation, the wheel speed detecting apparatus 21, guided by the press fitting tool P, is mounted on the inboard side end portion of the outer member 4. The wheel hub 1 and the outer joint member 14 are integrally connected to each other by inserting a radially expanding tool, such as a mandrel, into the bore of the fitting portion 20b of the shaft portion 20 and plastically deforming and forcing the material of the fitting portion 20b to bite into the hardened irregular portion 12 of the wheel hub 1.

Other connecting mechanism between the wheel hub 1 and the outer joint member 14 may be adopted. For example, they can be axially secured by inserting the shaft portion of the outer joint member into the wheel hub and radially outwardly caulking the end of the shaft portion projecting from the wheel hub.

The maximum outer diameter of the sensor holder 22, forming the wheel speed detecting apparatus 21, and the maximum outer diameter of the constant velocity universal joint 3, including a boot (not shown), are set so that they do not exceed the outer diameter of the pilot portion 4c of the outer member 4. Thus, it is possible to assemble the wheel bearing apparatus as well as an axle module, to be connected to the wheel bearing apparatus including a driving shaft and inboard side constant velocity universal joint, onto the knuckle N. This improves the workability in disassembly and re-assembly during servicing of the vehicle. In addition, the shaft portion 20 of the outer joint member 14 can be fit into the wheel hub 1. Also, the wheel speed detecting apparatus 21, guided by the press fitting tool P can be mounted on the inboard side end portion of the outer member 4. Thus, this makes it possible to reduce the number of assembling steps and thus the manufacturing cost.

FIG. 6 is a longitudinal-section view of a second embodiment of a wheel bearing apparatus incorporating with a wheel speed detecting apparatus of the present disclosure. FIG. 7 is a partially enlarged longitudinal-section view of FIG. 6. The second embodiment is different from the first embodiment only in the structure of the wheel speed detecting apparatus. Accordingly, the same reference numerals are used in this embodiment to designate the same parts having the same functions as those used in the first embodiment.

In this embodiment a wheel speed detecting apparatus 35 is arranged at the inboard side end of the outer member 4. As shown in the enlarged view of FIG. 7, the wheel speed detecting apparatus 35 includes a sensor holder 36, inboard side seal 37, 38 and magnetic encoder 23. The sensor holder 36 is fit onto the inboard side end of the outer member 4. The inboard side seals 37, 38 are interposed between the sensor holder 36 and the outer joint member 14. The magnetic encoder 23 is arranged opposite to the sensor holder 36.

The sensor holder 36 includes the annular fitting ring 24 and a holding portion 39 united to the fitting ring 24. The maximum outer diameter of the sensor holder 36 is smaller than a pilot portion 4c of the outer member 4 fit into the knuckle N. The cylindrical portion 24c of the fitting ring 24 is formed with the aperture 27. The holding portion 39 is integrally molded with the cylindrical portion 24c. The first and second seals 37, 38 are mounted within an annular space formed by the cylindrical portion 24c of the fitting ring 24 and the outer joint member 14. The sensor holder 36 is press fit and secured onto the end portion of the outer member 4. The flange portion 24b of the fitting ring 24 intimately contacts the end face of the outer member 4.

The holding portion 39 may be formed of synthetic resin such as PA (polyamide) 66 and has a generally L-shaped cross-section. The wheel speed sensor 26 is embedded in the holding portion 39 so that it opposes the magnetic encoder 23, via a predetermined axial air gap.

A terminal "Ha" for taking out the output signal from the wheel speed sensor 26 extends upward radially outward from the sensor 26. The terminal Ha is connected to a harness H led out circumferentially along the end of the outer member 4, via a lead out portion "Hb". Thus similarly to the first embodiment, it is possible to prevent the holding portion 39 or harness H from projecting from the outer member 4 and interfering with the knuckle N. This simplifies the parts arrangement around the wheel speed sensor 26. Accordingly, this reduces the size of the holding member 39.

The first seal 37 includes a metal core 40. The metal core 40 has a cylindrical portion 40a and standing portion 40b. The cylindrical portion 40a is fit into the cylindrical portion 24c of the fitting ring 24. The standing portion 40b extends radially inward from the cylindrical portion 40a. The core 40 has a substantially L-shaped cross-section. A sealing member 41 is adhered to the metal core 40, via vulcanized adhesion. The sealing member 41 has a pair of radial lips 41a, 41b in sliding contact with the outer circumference of the shoulder portion 19 of the outer joint member 14.

The second seal 38 includes a metal core 42 with a cylindrical portion 42a and a standing portion 42b. The cylindrical portion 42a is fit onto the shoulder portion 19 of the outer joint member 14. The standing portion 42b extends radially outward from the cylindrical portion 42a. The core 42 has a substantially L-shaped cross-section. A sealing member 43 is adhered to the metal core 42, via vulcanized adhesion. The sealing member 43 has a pair of radial lips 43a, 43b in sliding contact with the cylindrical portion 24c of the fitting ring 24. In addition, the magnetic encoder 23 is made of an elastomer such as rubber. Magnetic powder such as ferrite is mingled into the rubber. The encoder 23 is adhered to the inboard side surface of the standing portion 42b, via vulcanized adhesion.

The first seal 37 is arranged at the outboard side of the holding portion 39. The wheel speed sensor 26 is embedded in the holding portion 39. The second seal 38, including the integrally adhered magnetic encoder 23, is arranged at the inboard side of the holding portion 39 wheel speed sensor 26. Accordingly, it is possible to prevent leakage of grease contained within the bearing as well as the ingress of foreign matter, such as magnetic powders from the external circumstances, into the magnetic encoder 23 and the detecting portion of the wheel speed sensor 26, even though the vehicle travels under severe circumstances.

A method for assembling the wheel bearing apparatus incorporating with the wheel speed detecting apparatus will be described with reference to FIG. 8. First, the second seal 38 is press fit onto the outer circumference of the shoulder portion 19 of the outer joint member 14. The sensor holder 36, to which the first seal 37 is previously mounted, is fit onto the inboard side end of the outer member 4. The shaft 20 of the outer joint member 14 is fit into the wheel hub 1 until the stepped portion 19a of the shoulder portion 19 of the outer joint member 14 abuts the end face 1c of the cylindrical portion 1b of the wheel hub 1. This occurs under a condition where the wheel hub 1 and the double row rolling bearing 2 are vertically nested with each other with the outboard side surface 7a of the wheel mounting flange 7 of the wheel hub 1 abutting a pedestal 34. The second seal 38 is fit onto the sensor holder 36. The wheel hub 1 and the outer joint member 14 are integrally connected to each other by inserting a radially expanding tool, such as a mandrel, into the bore of the fitting portion 20b of the shaft portion 20 and plastically deforming and forcing the material of the fitting portion 20b to bite into the hardened irregular portion 12 of the wheel hub 1.

The second seal 38 is press fit onto the shoulder portion 19 of outer joint member 14. Thus, it is possible, similarly to the first embodiment, to fit the sensor holder 36, to which the first seal 37 is previously mounted, into the position of the second seal 38 and to mount the sensor holder 36 on the end portion of the outer member 4 simultaneously with fitting the shaft portion 20 of the outer joint member 14 into the wheel hub 1.

The wheel bearing apparatus incorporating a wheel speed detecting apparatus can be applied to wheel bearing apparatus of the fourth generation of inner ring rotation type where the wheel speed detecting apparatus is self-contained.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus incorporating a wheel speed detecting apparatus formed by a unit of a wheel hub, a double row rolling bearing and a constant velocity universal joint, the double row rolling bearing comprising:

an outer member integrally formed, on its outer circumference, with a body mounting flange to be mounted on a knuckle (N) forming part of a suspension apparatus, and said outer member formed, on its inner circumference, with double row outer raceway surfaces;

an inner member including the wheel hub with an integrally formed wheel mounting flange at one end and a cylindrical portion axially extending from the wheel mounting flange, an inner raceway surface formed on the outer circumference of the cylindrical portion, said inner raceway surface corresponding to one of the double row outer raceway surfaces, and an outer joint member of the constant velocity universal joint, the outer joint member formed with another inner raceway surface corresponding to the other of the double row outer raceway surfaces and having a shaft portion axially extending from said other inner raceway surface;

double row rolling elements rollably arranged between the outer and inner raceway surfaces;

seals mounted in annular spaces formed at opposite ends of the outer member and the outer joint member;

a wheel speed detecting apparatus comprising a magnetic encoder fit onto the outer joint member;

a wheel speed sensor arranged opposite to the magnetic encoder via a predetermined air gap and mounted on the end of the outer member;

said wheel hub and said outer joint member integrally connected by caulking the shaft portion of the outer joint member onto the wheel hub:

said wheel speed detecting apparatus further comprises a sensor holder, the sensor holder including a steel annular fitting ring to be fit onto the end of the outer member, and a holding portion of plastic resin integrally molded with the annular fitting ring and having the wheel speed sensor embedded therein;

inboard side seal of said seals is arranged between the sensor holder and the outer joint member; and that the maximum diameter of the sensor holder and the constant velocity universal joint is smaller than the inner diameter of the knuckle.

2. The wheel bearing apparatus of claim 1, wherein the annular fitting ring comprises a cylindrical fitting portion press fit onto the outer member, a flange portion extending radially inward from the fitting portion and in intimate contact with the end face of the outer member, and a cylindrical portion axially extending from the flange portion, and said holding portion is formed so that it projects radially inward from the cylindrical portion and the seal is arranged at the inboard side of the holding portion.

3. The wheel bearing apparatus of claim 1, wherein the magnetic encoder is arranged at the outboard side of the holding portion.

4. The wheel bearing apparatus of claim 1, wherein the magnetic encoder is formed integrally with the seal.

5. The method for assembling a wheel bearing apparatus incorporating a wheel speed detecting apparatus of claim 1 comprising the steps of:

press fitting the seal onto the outer circumference of the outer joint member;

fitting the sensor holder onto the end of the outer member;

fitting the outer joint member into the wheel hub;

caulking the shaft portion of the outer joint member onto the wheel hub by plastically deforming the shaft portion;

fitting the sensor holder, previously guided into a joint press fitting tool, into the position of the seal after said seal press fitting step; and mounting the sensor holder onto the outer member via the joint press fitting tool simultaneously with the fitting of the outer joint member into the wheel hub.

* * * * *